US012787977B1

(12) United States Patent
Barrelli

(10) Patent No.: US 12,787,977 B1
(45) Date of Patent: Nov. 10, 2026

(54) ANIMAL COLLAR

(71) Applicant: CS TECH US, Oceanside, CA (US)

(72) Inventor: Jennifer Barrelli, Oceanside, CA (US)

(73) Assignee: CS TECH US, Oceanside, CA (US)

( * ) Notice: Subject to any disclaimer, the term of this patent is extended or adjusted under 35 U.S.C. 154(b) by 0 days.

(21) Appl. No.: 19/340,291

(22) Filed: Sep. 25, 2025

(51) Int. Cl.
*A01K 13/00* (2006.01)

(52) U.S. Cl.
CPC .................................. *A01K 13/006* (2013.01)

(58) Field of Classification Search
CPC ................ A01K 13/006; A01K 27/006; A61D 2003/003
See application file for complete search history.

(56) References Cited

U.S. PATENT DOCUMENTS

| | | | | | |
|---|---|---|---|---|---|
| 3,036,554 | A * | 5/1962 | Johnson | A61D 9/00 | 119/815 |
| D855,903 | S * | 8/2019 | Cai | D30/152 | |
| 2009/0241855 | A1 * | 10/2009 | Stocki | A61D 9/00 | 119/815 |
| 2018/0077901 | A1 * | 3/2018 | Hallquist | A01K 13/006 | |
| 2020/0315762 | A1 * | 10/2020 | Correa | A61D 9/00 | |

FOREIGN PATENT DOCUMENTS

| | | | | |
|---|---|---|---|---|
| DE | 19629581 | A1 * | 1/1998 | A01K 13/006 |
| GB | 2472467 | A * | 2/2011 | A01K 27/00 |
| KR | 20180001256 | U * | 5/2018 | A01K 29/00 |

* cited by examiner

*Primary Examiner* — Ebony E Evans
(74) *Attorney, Agent, or Firm* — Reid E. Dammann; Gordon Rees Scully Mansukhani LLP

(57) ABSTRACT

An Elizabethan collar having one or more straps. The straps may be a hook-and-loop strap that is threaded through slots located in the main body of the collar. The collar has slots located at different positions to allow the collar to be adjustable to different positions and sizes.

18 Claims, 2 Drawing Sheets

ANIMAL COLLAR

GENERAL DESCRIPTION

This application relates to systems and methods for animal care and recovery. In an exemplary embodiment, the system and method relate to the construction, adjustment, and securing of a protective conical collar for an animal. More particularly, the invention pertains to a protective collar apparatus that incorporates an adjustable cone with a unique fastening system for securing the collar around an animal's neck.

Following surgical procedures or during the treatment of injuries, animals often require a protective barrier to prevent them from licking, biting, or scratching at wounds or dressings. The most common solution is the Elizabethan collar, or "e-collar," a truncated cone that fits around the animal's neck. These devices serve a critical function in postoperative care by shielding the affected area and allowing it to heal without interference.

To ensure the effectiveness of a protective collar, a secure and reliable fit is essential. The present invention introduces an innovative fastening system for adjusting and securing the protective collar. The apparatus features one or more fastening systems, such as hook-and-loop tabs, attached to a first end of the collar's main body. A plurality of corresponding fastening slots are located on a second end of the main body.

By threading the fastening system through the appropriate slots and folding it back onto itself, a user can securely cinch and fasten the collar to a desired diameter. This design allows the ends of the main body to be overlapped and locked in place, providing a mechanically stable linkage that is user-friendly and accommodates animals of various neck sizes, ensuring the protective cone remains properly positioned.

The present invention provides a specific apparatus-based solution that improves the function and reliability of a protective cone. The creation of a persistent and mechanically stable linkage between the two ends of the collar results in a new form of reliable, post-operative animal protection.

SUMMARY

The embodiments disclosed herein relate to systems and methods that improve the efficacy and security of protective pet collars. Embodiments include an apparatus configured to be formed into a protective cone around an animal's neck, the apparatus comprising at least one fastening system on a first end and a plurality of fastening slots on a second end. The system secures the protective cone by allowing a user to thread the fastening system through a selected slot and secure it back onto itself, typically using a hook-and-loop fastener. This structure provides a technical advantage by creating a secure and adjustable closure, significantly improving the collar's resistance to being pushed off over the animal's head. The system cinches the overlapped ends of the cone, and may also include soft edging and ventilation slots. This design improves the functioning of the protective collar itself by enabling a more secure, comfortable, and reliable application.

In one embodiment, a pet collar apparatus is disclosed. The protective pet collar apparatus comprising: a main body having a first end and a second end, said main body being configurable from a planar sheet into a truncated cone. At least one fastening system attached to the first end of said main body, wherein the at least one fastening system comprises a strap having a hook-and-loop surface. A plurality of fastening slots defined in the second end of said main body, wherein the strap of the at least one fastening system is configured to be threaded through at least one of the plurality of fastening slots and folded back upon itself to engage the hook-and-loop surface together, thereby securing the first end and the second end of said main body in an overlapped and adjustable configuration.

In one embodiment, a pet collar apparatus is disclosed. The protective pet collar apparatus, comprising a main body formed from a sheet of semi-rigid material, the main body having a first end and a second end, an inner circumference, and an outer circumference. It also comprises one or more fastening systems disposed on the first end of the main body, wherein each fastening system comprises a first fastening component and a second fastening component, and a plurality of fastening slots disposed on the second end of the main body. Wherein the one or more fastening systems are configured to be threaded through the plurality of fastening slots and folded back to engage the first fastening component with the second fastening component, thereby securing the first end of the main body to the second end.

In one embodiment, a pet collar apparatus is disclosed. The protective pet collar apparatus, comprising a main body formed from a sheet of semi-rigid material, the main body configured to be formed into a truncated cone shape and comprising a first end, a second end, an inner circumference, and an outer circumference. The apparatus also has at least one adjustable strap affixed to the first end of the main body, the strap comprising a hook-and-loop fastener, and a plurality of adjustment apertures located at the second end of the main body, wherein the plurality of adjustment apertures are arranged in parallel rows, and wherein the at least one adjustable strap is configured to be passed through one of the adjustment apertures and secured back onto itself to fasten the collar.

DETAILED DESCRIPTION

The particulars shown herein are by way of example and for purposes of illustrative discussion of the disclosed embodiments and are presented to provide a readily understood description of the principles and conceptual aspects. In this regard, no attempt is made to show structural details in more detail than is necessary for a fundamental understanding, and the description taken together with the drawings make apparent to those skilled in the art how the disclosed devices and methods may be embodied in practice.

The principles of the present invention are broadly applicable to any apparatus requiring a secure and adjustable closure, particularly within the field of protective animal care devices. The inventive concept involves an integrated fastening mechanism where a main body, configurable into a cone, is secured by threading one or more fastening members located on a first end through a plurality of corresponding apertures on a second end. This creates a reliable and adjustable overlapped connection. The following description, taken together with the drawings, makes apparent to those skilled in the art how the disclosed methods and apparatus may be embodied in practice.

Figure 1:
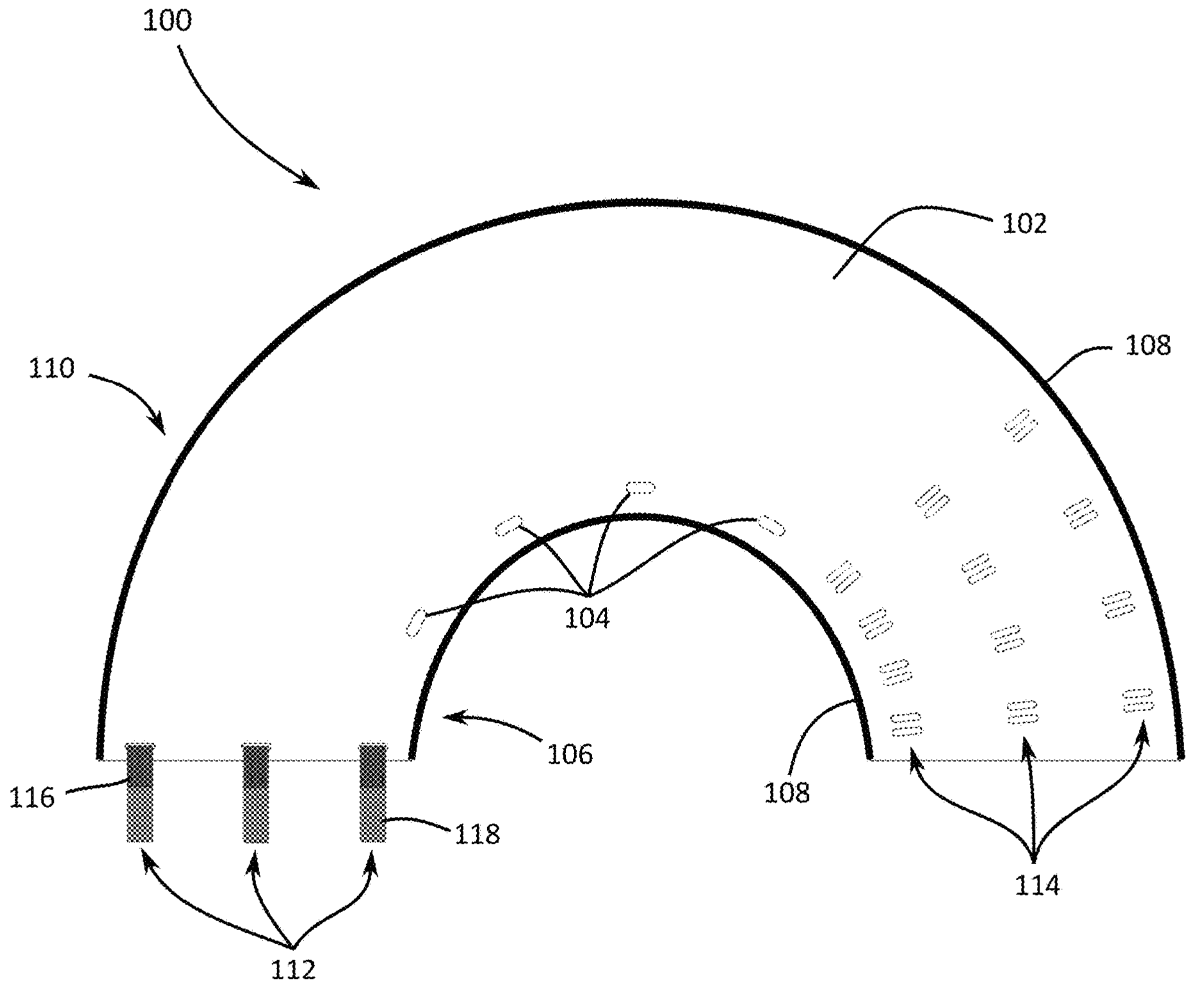
FIG. 1 is a top view of the collar system in an unassembled, flat configuration.

Referring to FIG. 1, an exemplary embodiment of the protective collar apparatus 100 is illustrated in its assembled, functional configuration. The apparatus 100 includes a main body 102, which is formed into a semi-circle configured to be formed into truncated cone shaped collar. The main body 102 is preferably constructed from a sheet of lightweight, semi-rigid, and translucent polymer, which provides a protective barrier while allowing the animal some peripheral vision. Affixed along the inner, narrower circumference 106 of the main body 102 are slots 104. These slots 104 are configured to provide ventilation when the collar is affixed to the animal. A soft fabric trim 108 may be applied to the inner circumference 106 and the outer circumference 110 to enhance comfort and prevent chafing. The collar also includes one or more fastening systems 112 attached at a first end of the main body, and a plurality of fastening slots 114 at a second end of the main body.

Figure 2:
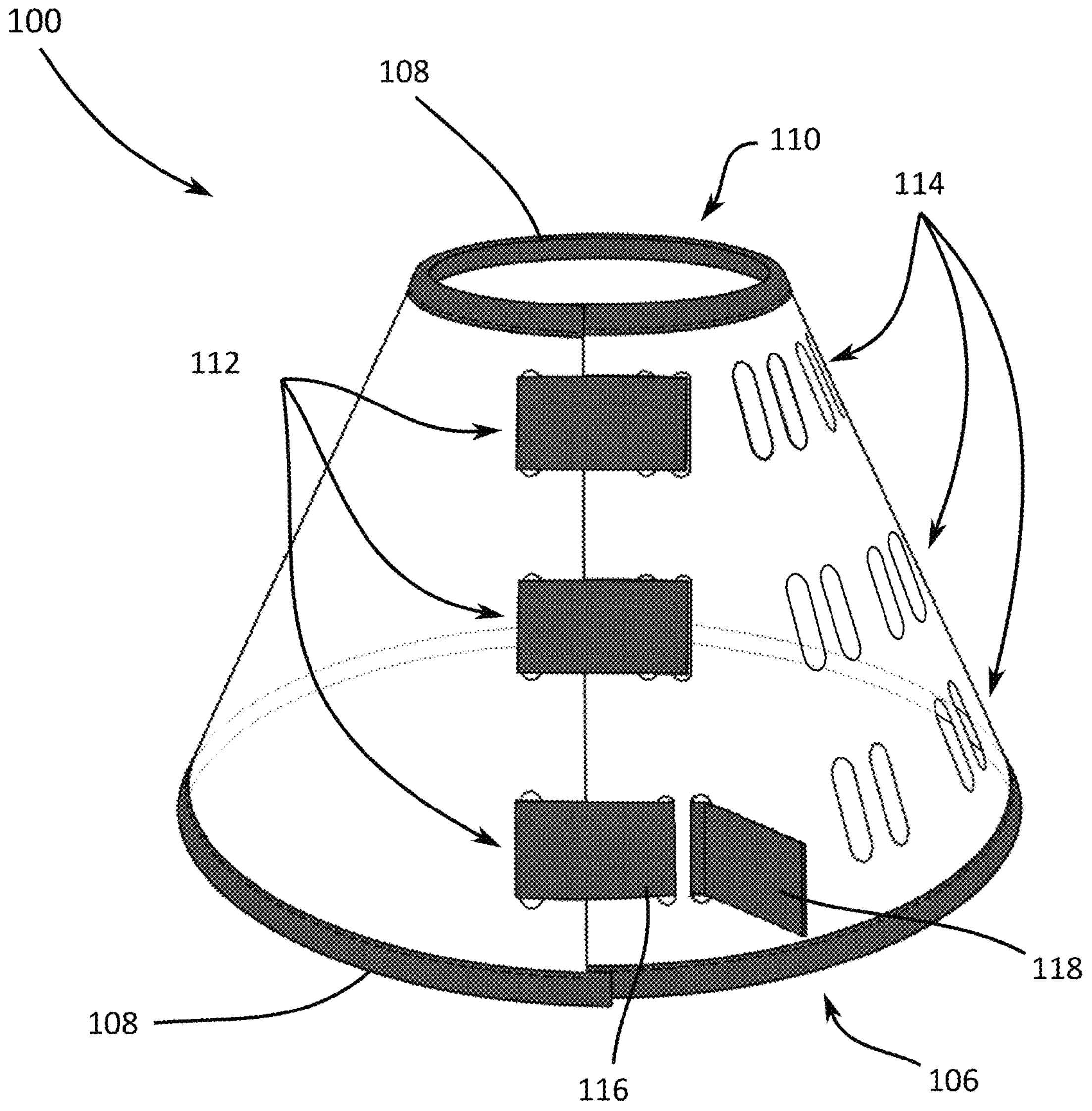
FIG. 2 is a detailed view showing the collar as shown in FIG. 1 in the assembled state.

Referring now to FIG. 2, a detailed view illustrates the adjustable fastening system 112 of the apparatus and shows the collar in its folded form. The fastening system 112 comprises a first fastening componen6, such as a patch of hook-type material, and a second fastening component 118, such as a loop type material. The fastening system 112 may be disposed on the first end of the main body 102. The collar 100 also includes multiple pairs of fastening slots 114 disposed the second end of the main body 102. As shown in FIGS. 1 and 2, these fastening slots 114 are arranged in multiple parallel rows, with each row running circumferentially along the main body at different radii. This parallel arrangement allows for fine-tuned adjustments to the collar's diameter, accommodating a wider range of neck sizes. While the fastening slots 114 are illustrated as having a specific elongated shape, it is to be understood that they may be configured in any geometry such as circular, rectangular, or any other suitable shape capable of receiving the fastening system 112. These pairs of slots 114 are configured to receive the fastening system 112 such that the fastening system is configured to be threaded through the slots 204 to fold back onto itself to engage its hook-and-loop surfaces together. This arrangement allows the ends of the main body 102 to be overlapped and securely fastened to accommodate various neck sizes. This action cinches and secures the overlapped ends of the main body 102, while allowing for a secure and adjustable fit.

It is to be understood that the number of fastening systems and fastening slots shown in the exemplary embodiments is not intended to be limiting. The quantity of fastening systems 112 and the corresponding fastening slots 114 may be varied depending on factors such as the overall size of the collar apparatus 100, the intended animal size, the desired level of adjustability, and the required securing strength. For instance, a larger collar designed for a larger animal may incorporate additional fastening systems and a greater number of slots to ensure a robust closure, while a smaller collar may require fewer. The scope of the invention therefore encompasses variations in the quantity and arrangement of these components to suit different applications.

The foregoing examples have been provided merely for the purpose of explanation and are in no way to be construed as limiting of implementations of the present invention. While aspects of the present invention have been described with reference to an exemplary embodiment, the words which have been used herein are words of description and illustration, rather than words of limitation. Changes may be made, within the purview of the appended claims, as presently stated and as amended, without departing from the scope and spirit of the present disclosure in its aspects. Although implementations of the present invention have been described herein with reference to particular means, materials and embodiments, implementations disclosed herein are not intended to be limited to the particulars disclosed herein; rather, implementations of the present invention extend to all functionally equivalent structures, methods and uses, such as are within the scope of the appended claims.

What is claimed is:

1. A protective pet collar apparatus, comprising:

a main body having a first end and a second end, said main body being configurable from a planar sheet into a truncated cone;

at least one fastening system attached to the first end of said main body;

a plurality of fastening slots arranged in a plurality of rows defined in the second end of said main body, wherein the at least one fastening system comprises a strap for each row of the plurality of fastening slots such that a number of straps equals a number of rows of the plurality of fastening slots, each strap having a hook-and-loop surface; and wherein each strap of the at least one fastening system is configured to be threaded through at least one of the plurality of fastening slots and folded back upon itself to engage the hook-and-loop surface together, thereby securing the first end and the second end of said main body in an overlapped and adjustable configuration.

2. The apparatus of claim 1, wherein the main body is constructed from a semi-rigid, translucent polymer.

3. The apparatus of claim 1, further comprising a soft fabric trim applied to an inner circumference and an outer circumference of the main body.

4. The apparatus of claim 1, further comprising a plurality of ventilation slots disposed along an inner circumference of the main body.

5. The apparatus of claim 1, wherein the plurality of fastening slots are arranged in multiple parallel rows along its circumference at different radii.

6. The apparatus of claim 1, wherein the planar sheet has a semi-circular geometry when laid flat.

7. A protective pet collar apparatus, comprising:

a main body formed from a sheet of semi-rigid material, the main body having a first end and a second end, an inner circumference, and an outer circumference;

one or more fastening systems disposed on the first end of the main body, wherein each fastening system comprises a first fastening component and a second fastening component;

a plurality of fastening slots arranged in a plurality of rows disposed on the second end of the main body, wherein the one or more fastening systems comprises a first and second fastening component for each row of the plurality of fastening slots such that a number of first or second fastening components equals a number of rows of the plurality of fastening slots; and wherein the one or more fastening systems are configured to be threaded through the plurality of fastening slots and folded back to engage the first fastening component with the second fastening component, thereby securing the first end of the main body to the second end.

8. The apparatus of claim 7, wherein the first fastening component is a hook-type material and the second fastening component is a loop-type material.

9. The apparatus of claim 7, further comprising a soft fabric trim applied to the inner circumference and the outer circumference of the main body to prevent chafing.

10. The apparatus of claim 7, wherein the plurality of fastening slots are arranged in parallel rows that run circumferentially along the main body.

11. The apparatus of claim 7, wherein the sheet of semi-rigid material is translucent.

12. A protective pet collar apparatus, comprising:

a main body formed from a sheet of semi-rigid material, the main body configured to be formed into a truncated cone shape and comprising a first end, a second end, an inner circumference, and an outer circumference;

at least one adjustable strap affixed to the first end of the main body, the strap comprising a hook-and-loop fastener; and a plurality of adjustment apertures located at the second end of the main body, wherein the plurality of adjustment apertures are arranged in parallel rows and are disposed in pairs of apertures, wherein the at least one adjustable strap is configured to be passed through a first aperture of a pair of apertures inwards relative to the main body, and outwards through a second aperture of the pair of apertures such that the at least one adjustable strap exits the main body to fasten the at least one adjustable strap to itself.

13. The apparatus of claim 12, further comprising a soft fabric trim applied to the inner circumference and the outer circumference of the main body.

14. The apparatus of claim 12, wherein the main body is formed from a translucent polymer.

15. The apparatus of claim 12, wherein the main body is a planar sheet in an un-assembled state.

16. The apparatus of claim 15, wherein the planar sheet has a semi-circular shape.

17. The apparatus of claim 12, wherein the plurality of adjustment apertures are elongated slots.

18. The apparatus of claim 12, wherein securing the at least one adjustable strap creates an overlapped configuration of the first end and the second end of the main body.

* * * * *